March 30, 1965 S. TESZNER 3,176,203
NEGATIVE-RESISTANCE TECNETRON
Filed Sept. 11, 1961 3 Sheets-Sheet 1

PRIOR ART

INVENTOR
STANISLAS TESZNER
BY
Abraham A. Saffitz
ATTORNEY

INVENTOR
STANISLAS TESZNER
BY
Abraham A. Saffitz
ATTORNEY

INVENTOR
STANISLAS TESZNER
BY
Abraham A. Saffitz
ATTORNEY

United States Patent Office 3,176,203

Patented Mar. 30, 1965

3,176,203
NEGATIVE-RESISTANCE TECNETRON

Stanislas Teszner, 49 Rue de la Tour, Paris, France

Filed Sept. 11, 1961, Ser. No. 137,357
Claims priority, application France, Sept. 15, 1960, 838,680; Aug. 12, 1961, 870,891
7 Claims. (Cl. 317—235)

This invention relates to tecnetron semiconductor devices, of use more particularly as triggers, binaries or equivalent circuits.

Tecnetron semiconductor devices are known, inter alia, from U.S. Patents Nos. 2,987,659, issued June 6, 1961, and 2,939,057, issued May 31, 1960, both in the name of the applicant. These devices are based on the principle of modulating the conductance of a zone of a semiconductive body by a centripetal electric field effect and are of use more particularly as amplifiers or oscillators or frequency converters. In essence the tecnetron devices thus disclosed comprise two terminal electrodes called respectively the source and the drain, or cathode or anode when the type of conductivity of the semiconductor is stated, and an intermediate electrode called the gate which modulates the cross-section of a conductive channel. In some conditions the tecnetron may have a negative-resistance characteristic and is then of use in monostable, bistable and astable multivibrators which are very simple and which have a very high rate of operation.

It has been found, however, that in these negative-resistance uses the structure of the tecnetron had to be altered so that some parts of the conventional structure with which were associated, in operation as amplifiers or oscillators, equivalent circuit elements considered as unfavorable and which endeavours were made to obviate or reduce in the conventional structure, are amplified and emphasized, and vice versa, for those parts of the conventional structure with which were associated equivalent circuit elements considered as favorable. More particularly, the source resistance—i.e. the resistance of that part of the tecnetron which is disposed between the gate and the carrier-emitting source electrode—the cathode if the semiconductor is of the N-type—is a parasitic resistance when the tecnetron operates as amplifier, but is essential when the tecnetron is required to operate as multivibrator, since the source resistance determines the voltage drop between the gate and the source electrode and therefore the internal bias level and the amplitude of the pulses produced by said multivibrator. However, the internal resistance of the two-terminal network equivalent to the tecnetron, such resistance being high before triggering, must drop to a very low value after triggering. The source resistance forms an integral part of the circuit and would be prohibitive if it remains constant after triggering. Consequently it is necessary to control this resistance as required in order that it may have an adequately high value before triggering and may be rendered very variable by triggering so as to drop to a low enough value after triggering. It is an object of this invention to achieve this result.

According to the invention, at least most of such source resistance is formed by a narrowing of the semiconductor rod, such narrowing being so disposed as to be literally submerged by the flow of minority carriers emitted by the gate barrier layer when biased in the forward direction. To this end, such resistance is disposed very near the corresponding end of the gate electrode, the length of said narrowed portion is small relatively to the length of diffusion of the minority carriers in the semiconductive body used, and the cross-section of the narrowed portion is low as compared with the cross-section of the flow of carriers emitted by the barrier layer.

According to the invention, such resistance is formed by cutting out in the groove or narrowed portion of the tecnetron and in that part of said groove located at the end of the gate electrode on the side near the source electrode—i.e., on the side near the cathode in the case of an N-type semiconductor, and on the side near the anode in the case of a P-type semiconductor—an extra groove of appropriately measured depth and of very reduced width.

The invention also relates to an electrolytic treatment process for tecnetrons of the kind considered, for etching a groove of appropriate depth and very reduced width at the end of the gate on the side near the source electrode, and, more particularly, to special steps for reducing very considerably the increase in the parasitic drain resistance arising from the etching, during such electrolytic treatment, of an unwanted groove at that end of the gate which is near the drain electrode.

In the electrolytic etching and cleaning process according to the invention, etching of the semiconductor at that end of the gate which is on the drain side is hampered, relatively to etching of the semiconductor at that end of the gate which is on the source side, by using an auxiliary D.C. source to reduce the potential difference between the gate and the drain relatively to the potential difference between the source and the gate; also, the auxiliary D.C. source is connected to the drain by way of a large electrode so that some of the current flowing between the gate and the drain is shunted through the electrolyte.

For a better understanding of the invention and to show how the same may be carried into effect, reference may now be made to the accompanying drawings wherein.

Figure 1:
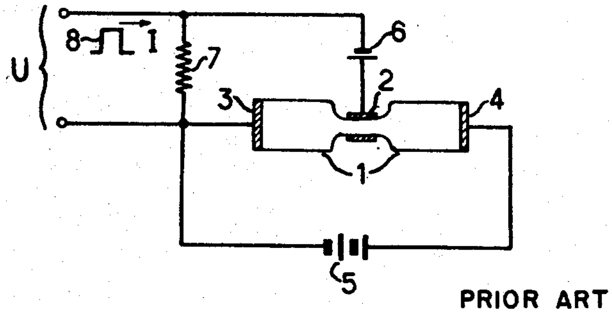
FIG. 1 illustrates a flip-flop circuit comprising a tecnetron.

FIG. 1 illustrates the simplest form of a conventional tecnetron circuit operating as flip-flop. A tecnetron 1 comprises an annular gate 2, a cathode 3 and an anode 4. By way of example, the semiconductive body is assumed to be of the N-type. Also visible are a current source 5 for supplying the anode 4, a bias source 6 for the gate 2, and a resistance 7 in the gate circuit.

The voltage-current characteristic is similar to that of a pentode with very marked saturation, so that there is internal biasing because of the voltage drop between the gate 2 and cathode 3. The source 6 helps to offset this bias by bringing the operating point of the tecnetron near the zero bias point, but the gate is still biased in the reverse direction and the current in its barrier layer is substantially zero; the resistance of the gate circuit is very high. A relatively low-amplitude positive pulse 8 applied across the resistance 7 can reverse the bias; since the barrier layer then experiences a voltage in the forward direction, its resistance drops to a very low value, while the resistance of that part of the gate circuit which is outside the resistance 7 is substantially determined by the cathode resistance—i.e., by the resistance of that part of the semiconductive body which is comprised between the cathode 3 and the gate 2—which is in turn reduced considerably because of the injection of minority charge carriers as a result of forward biasing of the rectifying contact of the gate.

Figure 2:
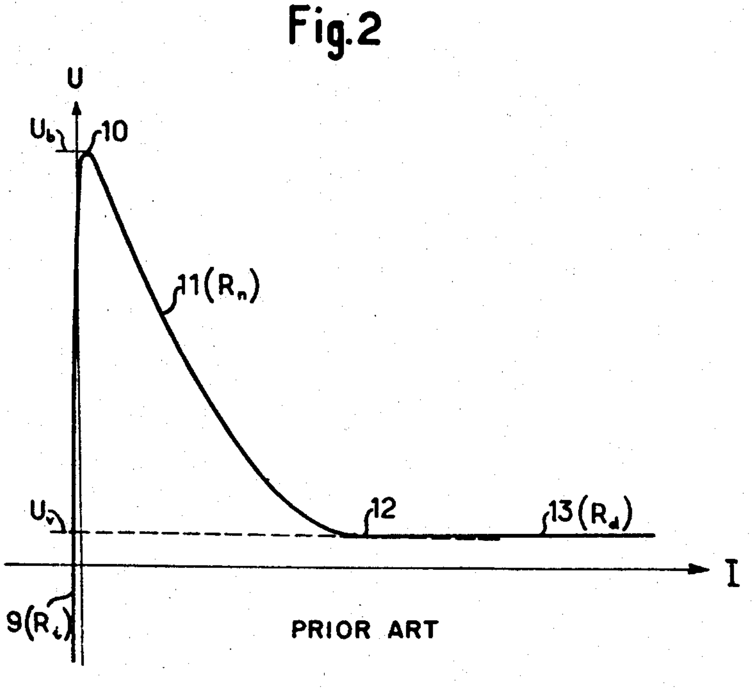
PRIOR ART Fig. 2
FIG. 2 is a voltage-current curve corresponding to flip-flopping of the circuit shown in FIG. 1.

FIG. 2 illustrates the voltage-current curve associated with flip-flopping. The portion 9 corresponds to operation before flip-flopping. Over most of the portion 9 the gate is biased backwards and so the current is negative. The small portion of the part 9 where the current is slightly positive, although the resistance remains very high, is characteristic of tecnetron operation and is a result of the gradual disappearance of the pinch-off of the channel below the gate upon the changeover from the backward to the forward direction thereof, of the increase in current flowing through the tecnetron, and of the gate-to-cathode voltage drop; this explains why, with slightly positive currents, the voltage continues to rise with current until a peak 10 is reached where flip-flopping occurs.

Flip-flopping is followed by a portion 11 of the curve which has a very negative resistance until a valley point 12 is reached corresponding to the minimum residual voltage, also known as the valley voltage. The dip 12 is followed by a slightly rising portion 13. The main characteristic parameters of this curve are the reverse differential resistance $R_i$ given by the slope of the portion 9, the flip-flopping voltage $U_b$, the valley voltage $U_v$, the differential negative resistance $R_n$ given by the slope of the curve portion 11, and the forward differential resistance $R_d$ given by the slove of the portion 13.

The ratios $U_b/U_v$ and $R_i/R_d$ must be very high, to which end $R_i$ must be very high, as must be the ratio of the gate-to-cathode resistances $R_{gc}$, before and after flip-flopping, for before flip-flopping the resistance $R_{gc}$ is the factor which determines $U_b$ as just described, whereas after flip-flop $R_{gc}$ tends towards $R_d$ and also determines $U_v$.

Figure 3:
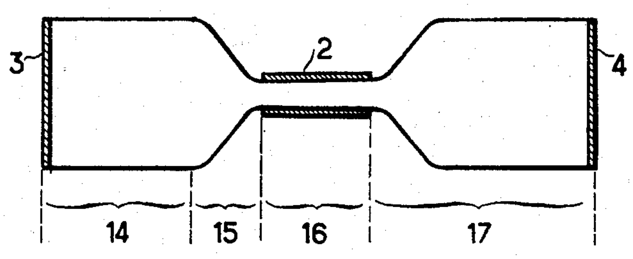
FIG. 3 illustrates the structure of a conventional tecnetron.
Figure 4:
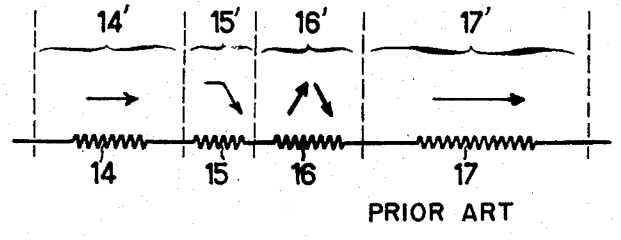
PRIOR ART Fig. 4
FIG. 4 illustrates the chain of internal resistances, considered in operation as a flip-flop, of the tecnetron shown in FIG. 3.

Referring now to the ordinary tecnetron structure as shown in FIG. 3, it will be apparent that the chain of its constituent resistances can be broken up from the flip-flop view point in the manner shown in FIG. 4. The chain comprises: (*a*) a resistance 14 rather slightly variable at the cathod end; this is the resistance of the terminal contact and of that part of the rod which is far enough away from the gate and of large enough cross-section for the flow of minority carriers which are injected not to be very sensitive (of course, such sensitivity decreases in proportion as the part considered is further away from the gate); (*b*) a resistance 15 adjacent the gate and very variable because of the injection of minority carriers; this resistance, which is fixed when the gate is experiencing the reverse voltage, drops rapidly when a forward voltage is applied; (*c*) a resistance 16 of the below-gate part which increases with negative biasing and decreases rapidly with positive biasing; and finally (*d*) a resistance 17 at the anode end which is fixed. Those parts of the structure to which the resistances 14–17 correspond have been given references 14′–17′. The horizontal and rising and descending arrows in FIG. 4 show the constancy or the direction of variation of the resistances in dependence upon gate biasing.

The resistance 17 merely effects consumption and, inter alia, increases the same. The resistance 14 is even more of a nuisance for it also has a bad effect on the resistance $R_d$ and upon the voltage $U_v$. Clearly, therefore, considerable advantages can be expected from reducing the chain of resistances to the resistances 15 and 16, corresponding to the portions 15′ and 16′, as far as possible.

Figure 5:
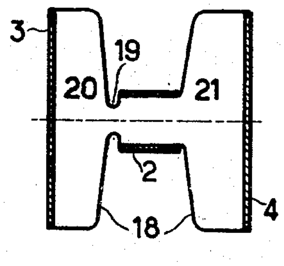
PRIOR ART Fig. 5
FIG. 5 illustrates the theoretical structure of the tecnetron according to the invention.

The structure shown in FIG. 5 helps towards this object. Within the groove 18, the base of which is surrounded with the conventional tecnetron gate electrode 2, is contrived a second and very small groove 19 as near one end of the electrode 2 as possible. The end where the groove 19 is disposed is the cathode end, in the case of an N-type semiconductor, and the anode end in the case of a P-type semiconductor. The rod portions 20, 21, and therefore the parasitic resistances at the cathode and anode ends, are reduced to a strict minimum.

However, in practice a structure such as that shown in FIG. 5 cannot be embodied exactly, because, whatever electrolytic treatment process may be used to contrive the groove 19 and to effect final cleaning of the semiconductor surface, an extra groove is formed substantially symmetrically of the groove 19 relatively to the gate.

The extra unwanted groove has the disadvantage of increasing the parasitic anode resistance and therefore the off-load consumption. This increased consumption can be offset to some extent by using the conical gate shape disclosed in U.S. Patent 2,939,057 above referred to in which case the structure shown in FIG. 6 results. A conical gate 23 disposed in a groove 24 is bounded at each end by a groove 25 (source side) by a groove 26 (drain side). Since the groove 26 is at the flared end of the cone, the extra parasitic resistance introduced is negligible, but the resistance should be reduced to a minimum and the manufacturing process to be described hereinafter helps to achieve this result without reducing the cleaning of the semi-conductor surface which would load to an intolerable reduction in the backward resistance of the tecnetron.

The manufacturing process differs from that for the conventional tecnetron having a cylindrically or conically shaped gate in that, in this invention, the electrolytic cleaning treatment is followed by the contriving of an extra groove in the ordinary groove of the tecnetron.

General cleaning of the rod, which will be assumed by way of example to be made of N-type germanium, is performed as follows:

The tecnetron rod, disposed within an annular electrode to which the gate connection is taken, is placed in a very diluted potassium or soda bath of a strength, for instance, of one gram per litre of distilled water. These electrodes are connected to the negative terminal of a D.C. voltage source, and the two ends of the rod are both connected to the positive pole of the same source. The applied voltage is of the order of 7 volts, the corresponding current is of the order of 30 ma., and the treatment time is about 2 minutes.

This general cleaning step is followed by electrolytic treatment for contriving the extra groove 19 and by final cleaning in a small vessel devoid of electrode and filled with boiling concentrated hydrogen peroxide, for instance, of about 30% or 110 volumes. The simplest arrangement for this treatment is to take the tecnetron gate and cathode connections to th enegative and positive terminals respectively of a D.C. source, the anode connection remaining insulated. The vessel is illuminated violently. The applied voltage is about 20 volts. The treatment time usually varies from 30 seconds to 3 minutes depending upon cathode resistance and, therefore, upon the depth of the small groove 19. The main disadvantage of this arrangement is that a groove of a more shallow but not negligible depth is contrived, symmetrically of the gate, as well as the groove 19. Also, the variation of cathode resistance cannot be checked during working. These disadvantages can be obviated by using an auxiliary source to apply a checking and biasing current to the germanium rod in the manner disclosed in U.S. patent application No. 764,105 and by giving appropriate dimensions to the electrodes through which the checking and biasing current is applied to the rod.

Figure 6:
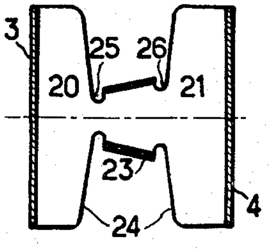
FIG. 6 is a variant of the structure shown in FIG. 5.
Figure 8:
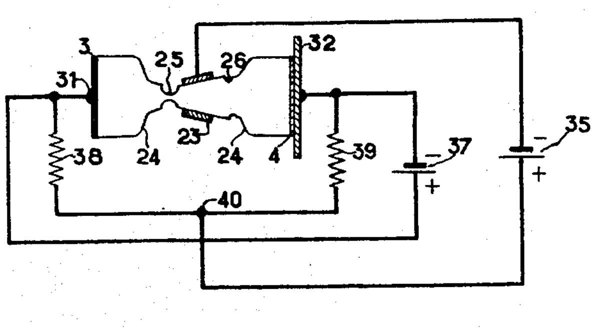
FIG. 8 is a variant of FIG. 7.
Figure 7:
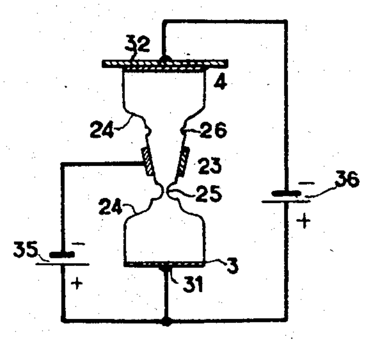
FIG. 7 illustrates a circuit diagram of use with a tecnetron for the electrolytic treatment according to the invention.

A first circuit arrangement of this kind, applied to a tecnectron having a trunco-conical gate as shown in FIG. 6, is illustrated in FIG. 7. The gate 23 is connected to the negative pole of a D.C. source 35, the positive pole of which is connected through a small-area electrode 31 to the tecnetron cathode 3. An auxiliary D.C. source 36 has its positive pole connected to the cathode 3 through the electrode 31 and its negative pole connected to the tecnetron anode 4 through a large electrode 32 having, for instance, the shape of a disc of a diameter much greater than the diameter of the anode 4, the purpose of which will be described hereinafter. Clearly, the source 36 tends to reduce the etching voltage near the anode 4 and therefore to reduce the etching of the groove 26. In the arrangement which is shown in FIG. 8 and which is applied to a tecnetron such as that shown in FIG. 6, the attacking voltage supplied by the source 35 is applied symmetrically between the gate 23 and a point 40 common to two resistances 38, 39, the resistance 38 being connected to the cathode 3 at 31, while the resistance 39 is connected through a large-area electrode 32 to the anode 4. A bias source 37 has its positive pole connected to the cathode 3 through the electrode 31 and its negative pole connected to the anode 4 through the electrode 32. The voltage supplied by the source 37 therefore divides between the interval 23–31 and the resistance 38 on the one hand, and between the interval 23–32 and the resistance 39 on the other hand. Consequently, the voltages actually operative upon such intervals increase in proportion as the small grooves 25 and 26 are etched, with the result that the asymmetry of the electrolytic etching is increased.

Figure 9:
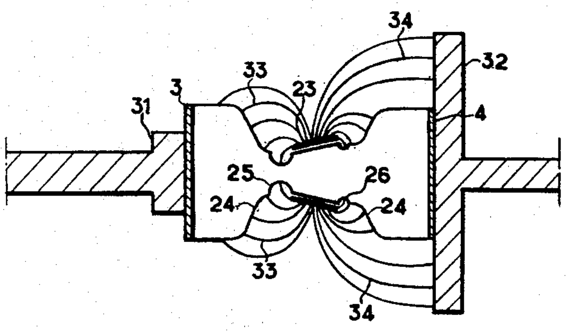
FIG. 9 is an explanatory diagram.

The use of a large-area electrode 32 and of a small-area electrode 31 for the final electrolytic etching and cleaning treatment leads, both in the arrangement shown in FIG. 7 and also in the arrangement shown in FIG. 8, to further reduction of the etching of the groove 26, for the reasons shown in FIG. 9. When the gate 23 is made negative relatively to the end electrodes 31 and 32, much of the current between the electrode 32 and the electrode 23 flows through the electrolyte along lines such as 34 without flowing through the semiconductor, whereas substantially all the current of the electrode 31, masked from the electrode 23 by the semiconductor, flows therethrough. Consequently, the small groove 26 is etched much less, both in width and in depth, than the small groove 24. The increase in parasitic anode resistance caused by the small groove 26 is therefore substantially negligible in the case of the trunco-conical shape shown in FIGS. 6–9 and remains acceptable with a cylindrically shaped gate.

The performances of negative-resistance tecnetrons constructed as hereinbefore described are at present as follows:

$U_b$ (flip-flopping voltage) up to 40 v., depending upon design and upon the anode-to-cathode voltage;
$U_d$ (residual forward voltage across terminals for a gate-to-cathode current of 20 ma.): 0.5 to 1.8 v.;
$R_i$ (reverse resistance): 15 to 50 megohms.
$R_d$ (forward resistance): 15 to 40 ohms.
Flip-flopping and return time: $25\times10^{-9}$ second, broken down as follows:
- Rise time: $20\times10^{-9}$ second.
- Drop time: $2\times10^{-9}$ second.
- Return time: $3\times10^{-9}$ second.

By way of illustration, the characteristic dimensions of a negative resistance tecnetron having a cylindrically shaped neck can be as follows for N-type germanium having a resistivity of 8 ohm-cms.

| | |
|---|---|
| Effective length of rod | 500μ |
| End diameter | 500μ |
| Width of main groove externally | 200μ |
| Groove base | 120μ |
| Diameter of groove base | 50μ |
| Length of gate | 80μ |
| Mean width of small groove near cathode | 20μ |
| Mean depth of last-mentioned groove | 12μ |

The resistance introduced by the small groove may cause a voltage drop of from about 15 to 20 volts; because of the reduced carrier mobility and the correlated increase in resistivity, due to the strong electric field in the groove (this mobility drops from the nominal value of 3900 cm.²/v. sec. to a value of from 600 to 800 cm.²/v. sec. in accordance with the voltage drop considered), the resistance of the groove is from about 15 to 20 kilohms. It should be noted that the extra-groove resistance constitutes the bias resistance of the gate. From the value of the necessary bias voltage of the gate, say between 10 and 20 volts, and from the critical value of the electric field in the semiconductor material (value of the field at which the mobility falls) namely about 900 volts per cm. in n-type germanium, a maximum value of the width of the extra-groove can be derived. It is equal to the ratio of said bias voltage by said critical field, which gives in the disclosed example a maximum width of from 100 to 200μ.

For a tecnetron having a conical gate, the characteristic dimensions are the same except that the single diameter of the groove base is replaced by two diameters corresponding to the two ends of the gate—in this case about 45μ and 70μ—also the depth of the small groove near the cathode is limited to 10μ.

The invention has been described in detail with reference to the use of germanium as semiconductive substance but is operative whatever semiconductive substance is used.

What I claim is:

1. A tecnetron semiconductor trigger device, comprising a substantially cylindrical semiconductor rod provided with a central groove of a given length, an ohmic source electrode and an ohmic drain electrode respectively at the ends of said rod, an annular gate electrode shorter than said given length, surrounding the central part of said central groove and having a rectifying contact therewith, and an additional groove in the central groove located for the gate electrode substantially flush with said gate electrode and on that side thereof near the source electrode the length of said extra-groove being smaller than the diffusion length of the minority carriers in said semi-conductor rod.

2. A tecnetron semiconductor trigger device, comprising a semiconductor substantially cylindrical rod provided with a central groove of a given length having a cylindrical shape, an ohmic source electrode and an ohmic drain electrode respectively at the ends of said rod, an annular gate electrode shorter than said given length, surrounding the central part of said central groove and having a rectifying contact therewith, and an additional groove located in the central groove for the gate electrode substantially flush with said gate electrode and on that side thereof near the source electrode the length of said extra-groove being smaller than the diffusion length of the minority carriers in said semiconductor rod.

3. A tecnetron semiconductor trigger device, comprising a semiconductor substantially cylindrical rod provided with a central groove of a given length, an ohmic source electrode and an ohmic drain electrode respectively at the ends of said rod, said central groove having a conical shape the flared end of which is on the drain electrode side, an annular gate electrode shorter than said given length, surrounding the central part of said central groove and having a rectifying contact therewith, and an additional groove in the central groove located for the gate electrode substantially flush with said gate electrode and on that side thereof near the source electrode the length of said extra-groove being smaller than the diffusion length of the minority carriers in said semiconductor rod.

4. A semiconductor tecnetron trigger two-terminal circuit adapted to selectively take a conducting state and a blocked state comprising a substantially cylindrical semiconductor rod, a central groove of a given length provided therein, a source electrode having an ohmic contact with one end of said rod and forming one terminal of said circuit, a drain electrode having an ohmic contact with the other end of said rod, an annular gate shorter than said given length surrounding the central portion of said central groove and having a rectifying contact therewith, a gate electrode connected to said gate and forming the second terminal of the circuit, an additional groove located in the central groove for said gate which is substantially flush with said gate and is disposed on that side thereof near the source electrode, means for applying a voltage between said source and drain electrodes, the length of said extra-groove being smaller than the diffusion length of the minority carriers in said semiconductor rod whereby the resistance of the additional grooved portion in the conducting state is decreased by the minority carriers injected by the gate and diffusing in said region.

5. A semiconductor tecnetron trigger two-terminal circuit adapted to selectively take a conducting state and a blocked state comprising a substantially cylindrical semiconductor rod, a source electrode having an ohmic contact with one end of said rod and forming one terminal of said circuit, a drain electrode having an ohmic contact with the other end of said rod, a central groove of a given length provided in said rod, said central groove having a conical shape the flared end of which is on the drain electrode side, an annular gate shorter than said given length surrounding the central portion of said central groove and having a rectifying contact therewith, a gate electrode connected to said gate and forming the second terminal of the circuit, an additional groove located in the central groove for said gate which is substantially flush with said gate and is disposed on that side thereof near the source electrode, means for applying a voltage between said source and drain electrodes, the length of said extra-groove being smaller than the diffusion length of the minority carriers in said semiconductor rod whereby the resistance of the additional grooved portion in the conducting state is decreased by the minority carriers injected by the gate and diffusing in said region.

6. A semiconductor tecnetron trigger two-terminal circuit adapted to selectively take a conducting state and a blocked state comprising a substantially cylindrical semiconductor rod, a central groove of a given length provided therein, a source electrode having an ohmic contact with one end of said rod and forming one terminal of said circuit, a drfain electrode having an ohmic contact with the other end of said rod, an annular gate shorter than said given length surrounding the central portion of said central groove and having a rectifying contact therewith, a gate electrode connected to said gate and forming the second terminal of the circuit, an additional groove located in the central groove for the gate substantially flush with said gate and is disposed on that side thereof near the source electrode, means for applying a voltage between said source and drain electrodes, the length of said additional groove being smaller than both the diffusion length of the minority carriers in said semiconductor rod whereby the resistance of the extra-groove portion in the conducting state is decreased by the minority carriers injected by the gate and diffusing in said region and the ratio of the voltage across said additional groove by the critical electric field for which the mobility of the carriers falls down whereby the resistance of the additional grooved portion in the blocked state is increased by the drop of the carrier mobility.

7. A semiconductor tecnetron trigger two-terminal circuit adapted to selectively take a conducting state and a blocked state comprising a substantially cylindrical semiconductor rod, a source electrode having an ohmic contact with one end of said rod and forming one terminal of said circuit, a drain electrode having an ohmic contact with the other end of said rod, a central groove of a given length provided in said rod, said central groove having a conical shape the flared end of which is on the drain electrode side, an annular gate shorter than said given length surrounding the central portion of said central groove and having a rectifying contact therewith, a gate electrode connected to said gate and forming the second terminal of the circuit, an additional groove located in the central groove for the gate substantially flush with said gate and on that side thereof near the source electrode, means for applying a voltage between said source and drain electrodes, the length of said extra-groove being smaller than both the diffusion length of the minority carriers in said semiconductor rod whereby the resistance of the additional grooved portion in the conducting state is decreased by the minority carriers injected by the gate and diffusing in said region and the ratio of the voltage across said extra-groove by the critical electric field for which the mobility of the carriers falls down whereby the resistance of the additional grooved portion in the blocked state is increased by the drop of the carrier mobility.

References Cited by the Examiner

UNITED STATES PATENTS

| | | | |
|---|---|---|---|
| 2,502,479 | 4/50 | Pearson | 317—235 |
| 2,939,057 | 5/60 | Teszner | 317—235 |

DAVID J. GALVIN, *Primary Examiner.*

JOHN W. HUCKERT, *Examiner.*